United States Patent
Bartha et al.

[11] Patent Number: 6,101,402
[45] Date of Patent: Aug. 8, 2000

[54] RADIOTELEPHONE WITH SLIDING ACOUSTIC MEMBER

[75] Inventors: Istvan Bartha; Curtis W. Thornton, both of Cary, N.C.

[73] Assignee: Ericcson Inc., Research Triangle Park, N.C.

[21] Appl. No.: 08/923,165

[22] Filed: Sep. 4, 1997

[51] Int. Cl.[7] .................................................. H04B 1/38
[52] U.S. Cl. ........................... 455/569; 455/575; 379/433
[58] Field of Search .............................. 455/90, 575, 550, 455/347, 349, 350, 351, 569; 379/428, 431, 433, 429; 381/170

[56] References Cited

U.S. PATENT DOCUMENTS

| | | | |
|---|---|---|---|
| 4,845,772 | 7/1989 | Metroka et al. | 379/61 |
| 5,151,946 | 9/1992 | Martensson | 379/38 |
| 5,197,091 | 3/1993 | Takagi et al. | 379/58 |
| 5,335,274 | 8/1994 | Masuda at al. . | |
| 5,369,788 | 11/1994 | Nagai | 455/90 |
| 5,446,789 | 8/1995 | Loy et al. | 379/433 |
| 5,539,834 | 7/1996 | Bartlett et al. | 381/170 |
| 5,555,449 | 9/1996 | Kim | 379/433 |
| 5,701,354 | 12/1997 | Komoda et al. | 379/433 |
| 5,751,804 | 5/1998 | Mendolia . | |
| 5,884,197 | 3/1999 | Ricardo et al. | 455/575 |

FOREIGN PATENT DOCUMENTS

| | | | |
|---|---|---|---|
| 0275996 | 1/1988 | European Pat. Off. | H04M 1/02 |
| 5-014465 | 1/1993 | Japan | H04M 1/02 |
| 2235850 | 3/1991 | United Kingdom | H04M 1/02 |
| 2310562 | 8/1997 | United Kingdom | H04M 1/02 |

OTHER PUBLICATIONS

PCT International Search Report for International Application No. PCT/US98/18146 dated Dec. 7, 1998.

*Primary Examiner*—Reinhard J. Eisenzopf
*Assistant Examiner*—Sam Bhattacharya
*Attorney, Agent, or Firm*—Myers Bigel Sibley & Sajovec, P.A.

[57] ABSTRACT

A radiotelephone having a slidably retractable member with an acoustic duct for transmitting sound through the member into a microphone housed in the radiotelephone's main body. The member is slidable to an extended position for use such that a sound inlet of the acoustic duct is exposed for collecting sound as a person speaks into it. Sound travels through the acoustic duct and passes directly through a sound outlet into the microphone. A sealing member adjacent the microphone acoustically seals the sound outlet to a sound port in the microphone. Features are provided on the slidable member and main body for guiding the member into its retracted and extended positions. Also, detent features hold the member in its two positions. In one embodiment, the member covers an external face of the radiotelephone when retracted. In another embodiment, the member is housed within the main body of the radiotelephone, and a portion of the sound inlet is adjacent the microphone in the retracted position for use without extending the member.

25 Claims, 7 Drawing Sheets

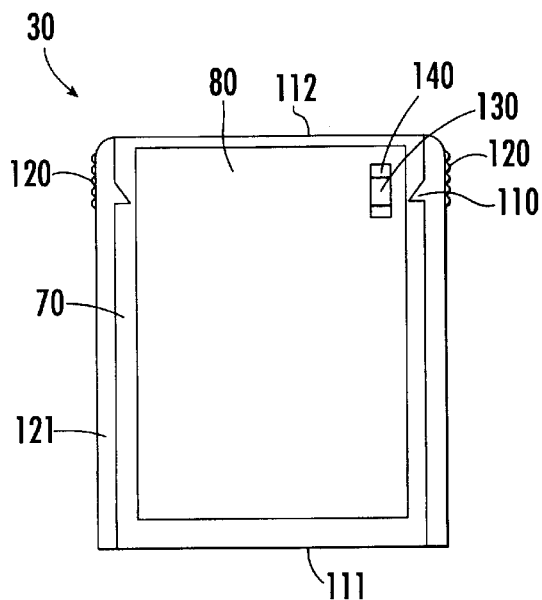
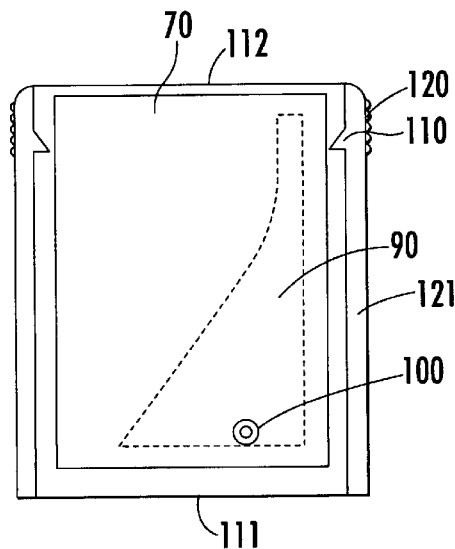
FIG. 3.    FIG. 4.
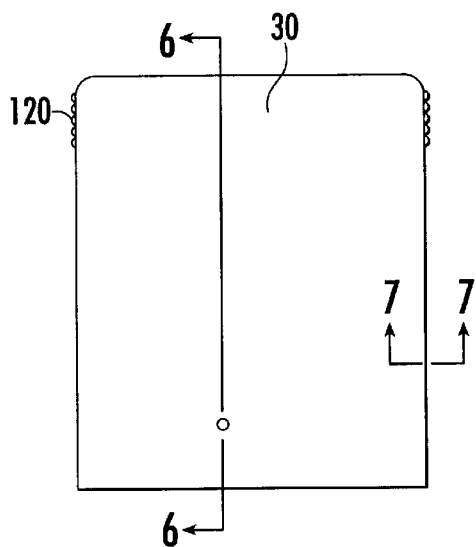
FIG. 5.

RADIOTELEPHONE WITH SLIDING ACOUSTIC MEMBER

FIELD OF THE INVENTION

This invention relates generally to portable radiotelephones, and more particularly to portable radiotelephones having extending members movable by a user.

BACKGROUND OF THE INVENTION

Portability is an increasingly important radiotelephone feature for consumers; therefore, radiotelephones are being designed and produced to be as small as possible. A common problem with small phones is that when a user holds a phone to his or her ear during use, the microphone is positioned far from the user's mouth, resulting is poor sound transmission. With an emphasis on miniaturization, numerous phones on the market now have a member which is compactly stowed against the phone's main body until a user extends the member. These extending members either rotate or slide out from the main body and are designed to enhance a phone's acoustical performance.

Many phones containing a microphone in the main body have an extending member that contains no electronics but merely acts as a surface which reflects a user's voice into the microphone when the member is extended and the phone is held to the user's ear. An example of such a radiotelephone is the model DH 338 manufactured by Ericsson Inc. Some extending members contain microphones such that when the member is extended, and the phone is held to a user's ear, the microphone is positioned near the user's mouth. The radiotelephone described in U.S. Pat. No. 4,845,772 to Metroka et al. contains a microphone in the extending member. Another type of extending member contains no electronics but does contain an acoustic duct which has an inlet that opens near a user's mouth and an outlet which opens into an aperture in the main body of the phone. The aperture in the phone leads directly to a microphone. When in use, acoustic ducts carry sound from the source to the microphone, dramatically improving sound quality and requiring no electronic parts.

At least two types of extending members with acoustic ducts are known, both of which are hinged to a phone and rotate about the hinge to an extended position for use. The first type described in European Pat. No. 275,996 B1 has an acoustic duct which opens in alignment with an opening in the main body only when the member is rotated out to its extended position. A tight fit between the extending member opening and the main body opening is required to maximize sound transmission. The second type embodied in Ericsson's model number AF 738 has an acoustic duct which leads through the hinge of the phone and opens in alignment with the member's axis of rotation and with an opening in the main body. Two arms of the hinge apply constant force to keep the opening of the extending member tightly abutting the opening of the main body.

All of the extending members described above have undesirable attributes. Firstly, although the extending member for voice reflection is inexpensive, easy to assemble, and easy to replace, it often does not reflect enough of the user's voice to adequately enhance sound quality. Secondly, when the extending member contains a microphone, there must be an electrical connection to the main body that must withstand repeated movement of the extending member. Phones of this type use expensive parts, are likely to break when dropped, and are difficult to assemble and repair. Thirdly, the extending members with acoustic ducts as mentioned above are prone to wear and either lose sound through leaks between the openings in the extending member and the main body, or they require a number of expensive, complicated sealing parts that are difficult to assemble.

Thus, small, portable radiotelephones are in need of extending members that are inexpensive, easy to assemble and replace, durable to repeated extensions, robust, and reliable while providing excellent acoustical performance.

SUMMARY OF INVENTION

A radiotelephone according to the present invention has an extending member that slides from a retracted position to an extended position. The extending member contains an acoustic duct with a sound inlet at the distal end of the member and a sound outlet at the proximal end of the member. The main body of the radiotelephone houses a microphone. A sealing element is disposed about the microphone and has an opening coincident with the sound port of the microphone. When the extending member is slid to its extended position, the sound outlet of the acoustic duct aligns with the opening in the sealing element. As a person comfortably holds the radiotelephone to his or her ear and speaks toward the phone's extending member, voice is transmitted into the sound inlet, through the acoustic duct, through the sound outlet, through the sealing element, and into the microphone. The sealing element ensures a sound path with minimal leakage between the sound inlet and the microphone.

In a first embodiment, the extending member is external to the radiotelephone in both retracted and extended positions. In both positions, the extending member covers the portion of the radiotelephone housing the microphone to protect the microphone from contaminants. In a second embodiment, the extending member is internal to the radiotelephone in the retracted position. This aspect of the invention enables storage of the extending member without having to conceal a portion of the radiotelephone.

BRIEF DESCRIPTION OF THE DRAWINGS

FIG. 3 is a back view of an extending member showing an assembled lid and label.

FIG. 4 is a back view of an extending member showing a lid with its label removed.

FIG. 5 is a front view of an extending member showing a sound inlet.

DETAILED DESCRIPTION OF THE INVENTION

Figure 1:
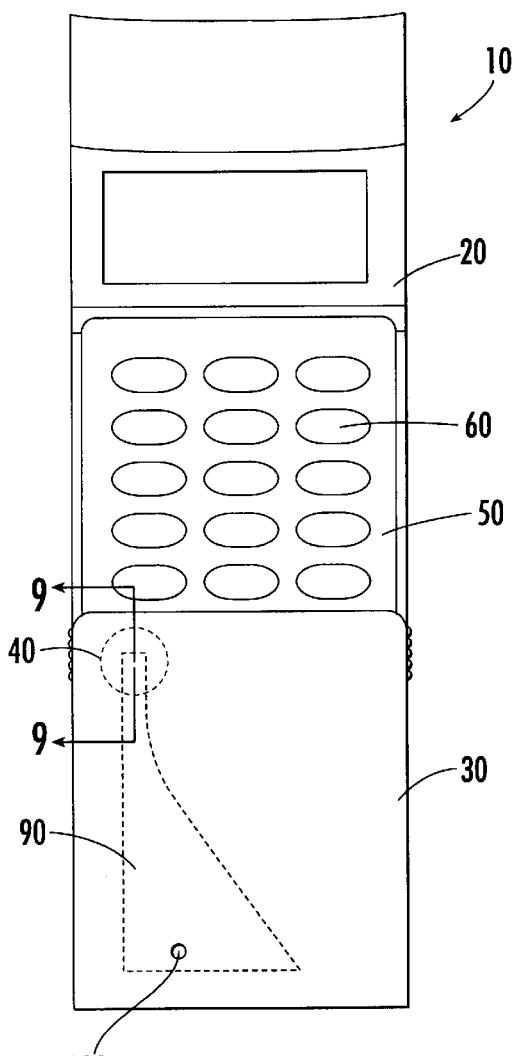
FIG. 1 is a front view of a radiotelephone in accordance with a first embodiment of the invention showing an extending member in an extended position.
Figure 2:
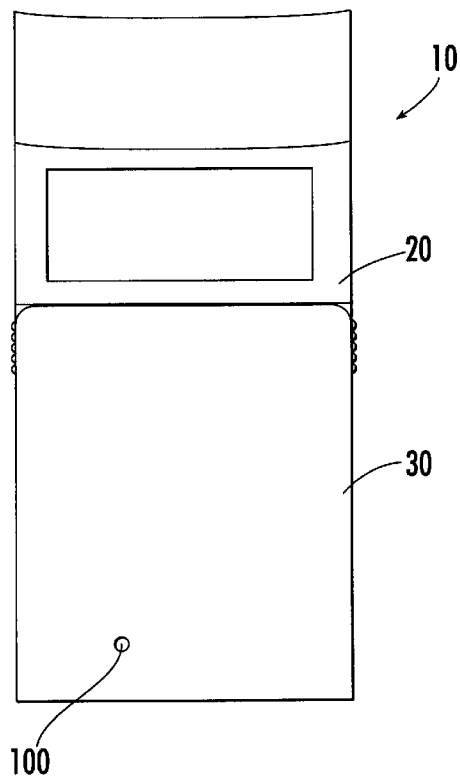
FIG. 2 is a front view of a radiotelephone with an extending member in a retracted position.

FIGS. 1 and 2 show an assembled radiotelephone 10 employing a first embodiment of the invention. As illustrated in FIG. 1, the radiotelephone 10 has a main body 20 and an extending member 30. A microphone 40, shown with hidden lines, is contained within the main body 20. The extending member 30 is slidable along the main body 20 between an extended position shown in FIG. 1 and a retracted position shown in FIG. 2. Preferably, the extending member 30 protectively covers at least a portion of a front face 50 of the main body 20 when slid to the retracted position for storage. In the extended position, the radiotelephone 10 is arranged for use, and the front face 50 is revealed to expose user interface apparatus such as a keypad 60.

Figure 6:
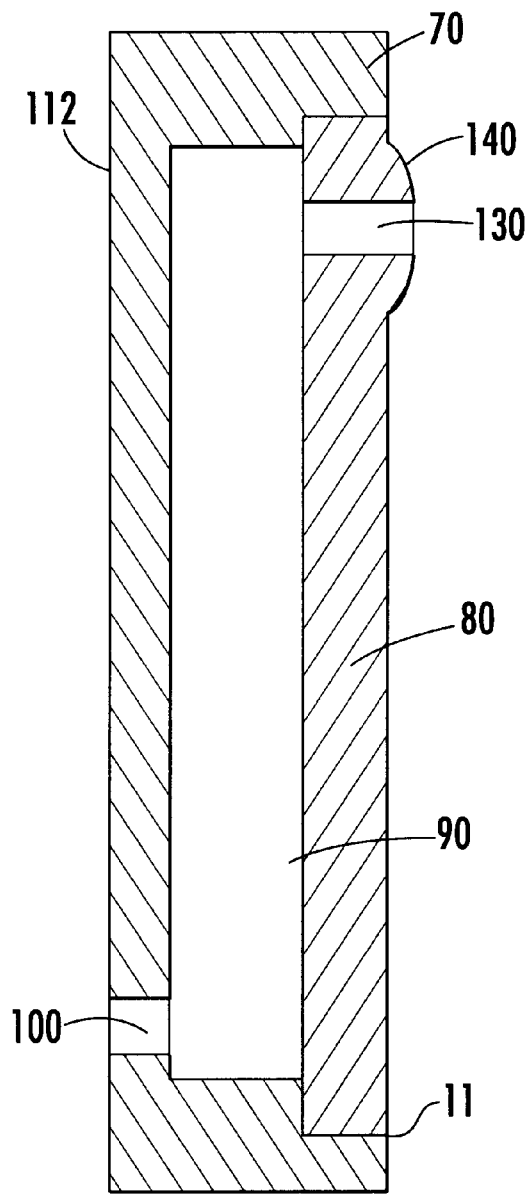
FIG. 6 is a cross-sectional view of the extending member through the acoustic duct.
Figure 7:
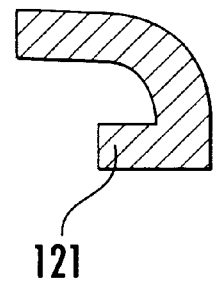
FIG. 7 is a partial cross-sectional view of the extending member.

More specific details of the extending member 30 are illustrated in FIGS. 3–7. FIG. 3 shows the underside of a complete extending member 30. The extending member 30 is primarily composed of two parts: a lid 70 and a label 80, both made typically of plastic, though metal and other materials may be used. FIG. 4 shows the underside of an extending member 30 with the label 80 removed. The lid 70 is preferably an injection molded part having an integral acoustic duct 90 and sound inlet 100. The acoustic duct 90 extends between a distal end 111 and a proximal end 112 of the extending member 30. The sound inlet 100 is a through-hole in the acoustic duct 90 at the distal end 111 of the extending member 30. The top side of the extending member 30 is illustrated in FIG. 5. FIG. 7 is a partial cross-section showing an inwardly-extending projection 121 on the lid 70. A similar projection is arranged on the opposite side of the lid 70 (FIG. 4). Detent features 110 are provided as flexible protrusions on projections 121 of the lid 70 at the proximal end 112 of the extending member 30. Finger grips 120 may also be provided on the extending member 30 to aid sliding.

The label 80, shown assembled with the lid 70 in FIG. 3, is simply a thin sheet of plastic having an integral sound outlet 130. The sound outlet 130 is a hole through the label 80. A convex region 140 may also be disposed about the sound outlet 130. The label 80 is glued, ultrasonically welded, or otherwise secured in a fixed relationship to the lid 70 such that the sound outlet 130 is in acoustic communication with the acoustic duct 90 at the proximal end 112 of the extending member 30. Upon assembling the label 80 to the lid 70, the acoustic duct 90 is covered and concealed except for the sound inlet 100 and sound outlet 130. As illustrated by the cross-section shown in FIG. 6, the sound inlet 100 opens at the distal end of the acoustic duct 90 to receive sound, and the sound outlet 130 opens at the proximal end of the acoustic duct 90 to transmit sound. In the preferred embodiment just described, the lid 70 and label 80 are simple and lack delicate parts. The resulting extending member 30 is easily and cheaply produced and is not susceptible to breakage and wear. Extending members according to the invention may be comprised of more or less parts, and their exact features and manufacturing methods may vary according to specific design requirements.

Figure 8:
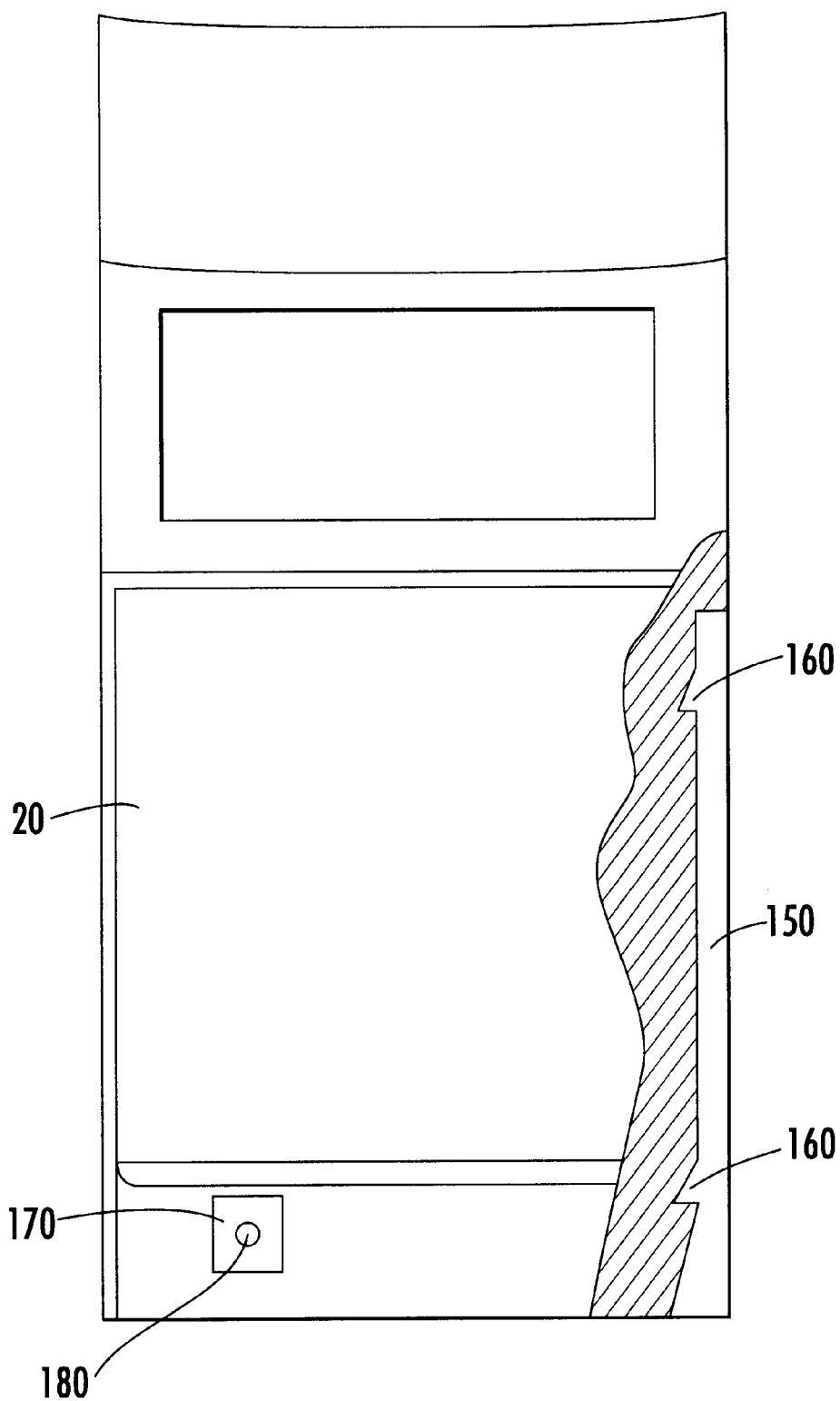
FIG. 8 is a front view of the main body of a radiotelephone with a partial cut-away view of the grooved track and detents.
Figure 9:
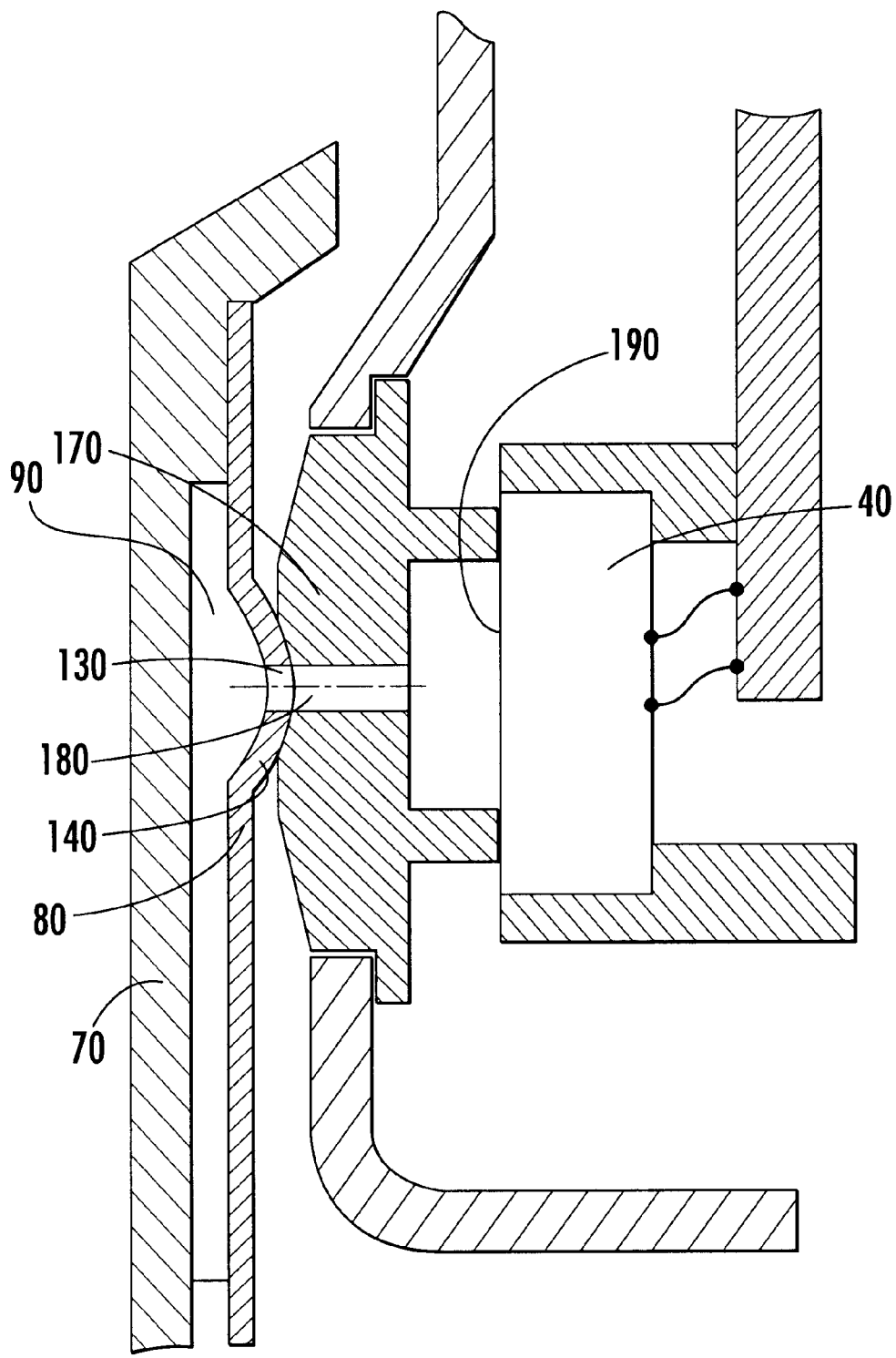
FIG. 9 is a cross-sectional view through the microphone when the extending member is in the extended position.
Figure 10:
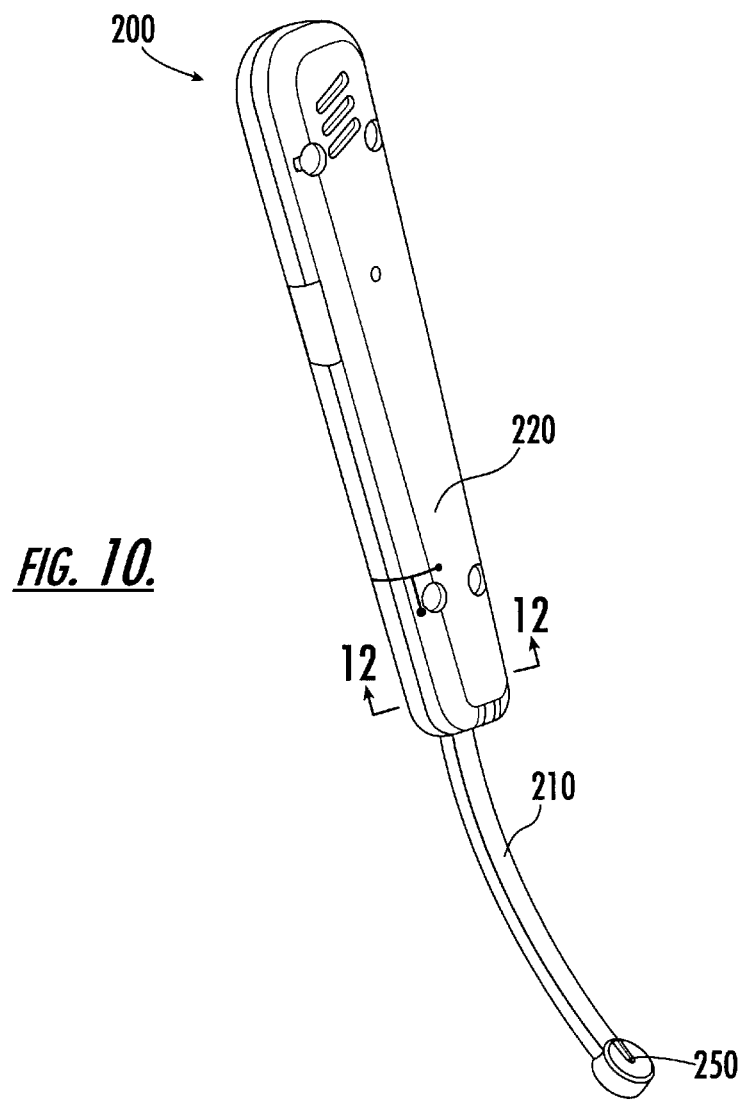
FIG. 10 is a perspective view of a second embodiment of the invention.
Figure 11:
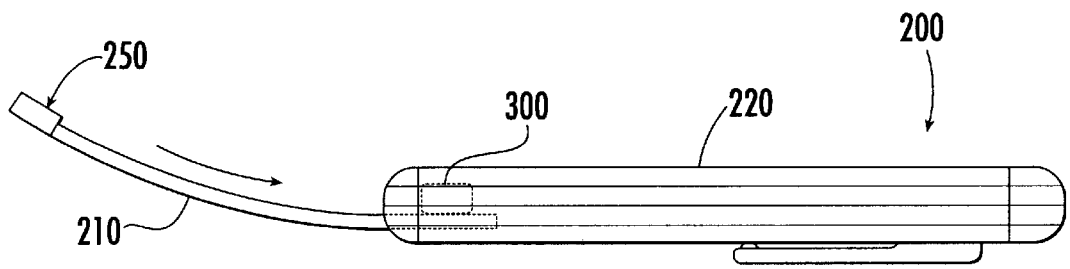
FIG. 11 is a side view of the second embodiment of the invention.

FIGS. 8 and 9 show more details of the radiotelephone 10 with particular attention given to features of the main body 20. A grooved track 150 and its detent features 160 on one side of the main body 20 are illustrated in the cut-away section shown in FIG. 8. A similar track and detent features are likewise provided on the opposite side of the main body 20. Also shown in FIG. 8 is a sealing element 170 which is secured to the main body and which has an opening 180. Both the sealing element 170 and its opening 180 are accessible external to the main body 20 of the radiotelephone. As demonstrated in FIG. 9, the sealing element 170 is disposed adjacent the microphone 40 with the opening 180 in fixed alignment with a sound port 190 of the microphone 40. The sealing element 170 is preferably an inexpensive grommet comprised of a compressible, closed-cell foam rubber.

To assemble the extending member 30 onto the main body 20, the projections 121 on each side of the lid 70 (FIGS. 3, 4) are snapped into or slid onto the track 150 of the main body 20 (FIG. 8). Detent features 110 on the extending member 30 mate with detent features 160 in the track 150 of the main body 20 to maintain the extending member 30 in its retracted and extended positions. Other types of configurations are also envisioned for guiding the extending member 30 as it slides along the main body 20. For example, guide rails could be located on the front face 50 of the main body 20 with corresponding channels on the extending member 30. Many devices such as spring-loaded pins and other releasable locking mechanisms may be used for holding the extending member 30 in its retracted and extended positions.

Once assembled, the extending member 30 is normally maintained in its retracted position (FIG. 2) while the radiotelephone 10 is in standby mode, ready to receive calls. In this position, the acoustic duct 90 is non-operable, and the opening 180 of the sealing element 170 is concealed by the extending member 30 such that dirt and other contaminants may not enter the opening 180 and damage the microphone 40.

When the user decides to answer an incoming call, to place a call, or to access features concealed by the extending member 30, he or she slides the extending member 30 down the main body 20 of the radiotelephone 10 to the extended position (FIG. 1) where it is held in place by the detent features 110 and 160 on the extending member 30 and main body 20, respectively. In the extended position, the sound outlet 130 of the acoustic duct 90 aligns with the opening 180 in the sealing element 170 as shown in the cross-section of FIG. 9. When the user comfortably places the radiotelephone 10 against his or her ear, the sound inlet 100 of the extending member 30 is located in close proximity to the user's mouth. Accordingly, as the user speaks, sound is projected into the sound inlet 100. As seen in FIGS. 6 and 9, the sound travels from the sound inlet 100, through the acoustic duct 90, through the sound outlet 130, through the opening 180 in the sealing element 170, and into the sound port 190 of the microphone 40. The tight abutment of the sound outlet 130 against the sealing element 170, facilitated by convex region 140, (FIG. 9) ensures very minimal sound leakage between the sound inlet 100 of the acoustic duct 90 and the microphone 40 in the main body 20 of the radiotelephone 10. The result is very good sound transmittal.

Figure 12:
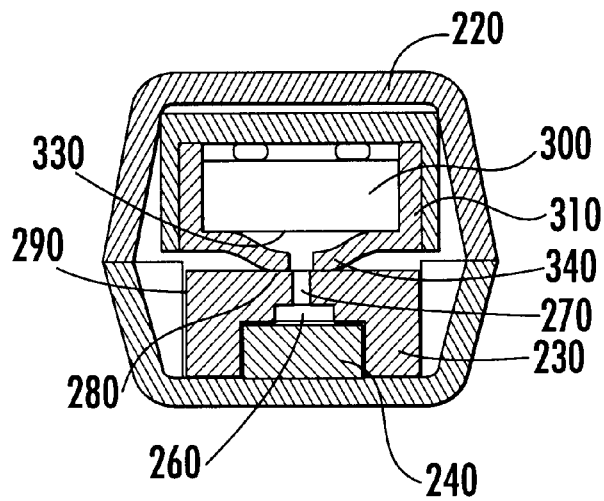
FIG. 12 is a cross-sectional view through the microphone of the second embodiment with the extending member extended.
Figure 13:
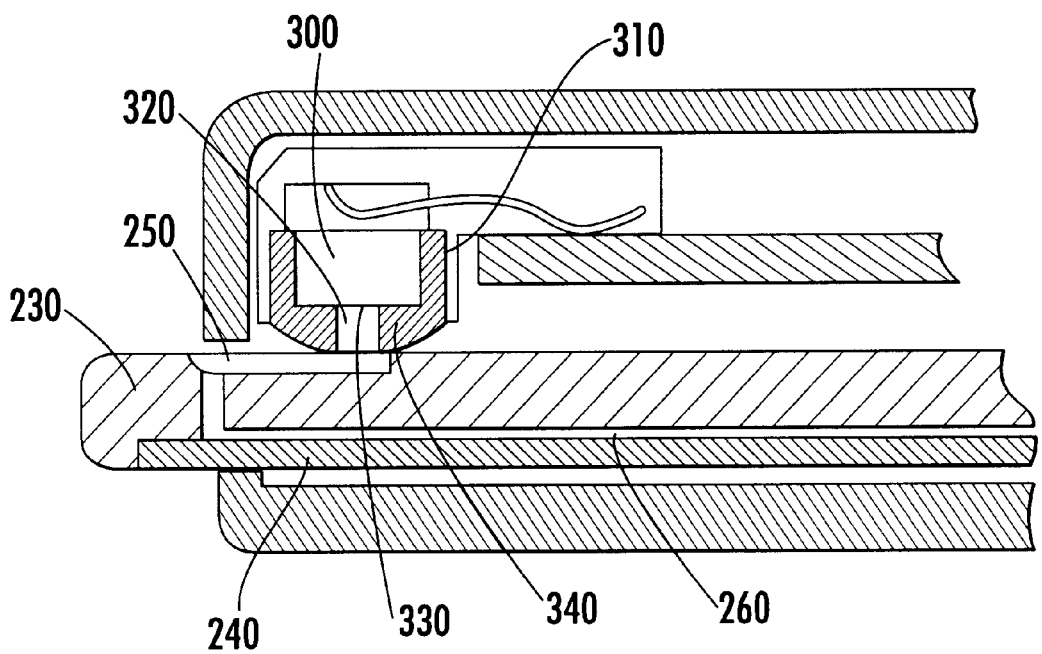
FIG. 13 is a cross-sectional view through the microphone of the second embodiment with the extending member retracted.

An alternative embodiment of the invention is depicted in FIGS. 10–13. An extending member 210 slides from a retracted position within a main body 220 of the radiotelephone 200 to an extended position (FIGS. 10, 11) external to the main body 220 of the radiotelephone 200. The construction of the extending member 210 in this embodiment is very similar to that of the embodiment previously described. The extending member 210 preferably comprises two main parts: a lid 230 and a label 240 (FIGS. 12, 13). In this embodiment, both a sound inlet 250 (FIG. 10) and a sound outlet 270 (FIG. 12) are formed in the lid. The sound inlet 250 in the lid 230 leads into an acoustic duct 260 (FIG. 12) which terminates with a sound outlet 270 in the lid 230. As shown in FIG. 12, a dimple 280 is preferably disposed about the sound outlet 270 to serve as a detent feature.

The label 240 is simply a strip of plastic secured to the lid 230 by gluing, ultrasonically welding, or other fastening technology. As shown by FIGS. 12 and 13, the label 240 forms a part of the acoustic duct 260 and provides for easy assembly.

The radiotelephone 200 and extending member 210 shown in FIGS. 10–13 are slender, elongated components; however, the shape of these components may vary according to design requirements.

The main body of the radiotelephone 200 includes a channel 290 (FIG. 12) which houses the extending member 210 in the retracted position and guides it to the extended position. Alternatively, a rib in the main body 220 and a groove in the extending member 210 could serve as guide features, for example. As shown in FIG. 12, a microphone 300 is contained in the main body 220 and is at least partly encompassed by a sealing element 310. An opening 320 in the sealing element 310 is positioned in fixed alignment with a sound port 330 of the microphone 300. A convex region 340 is disposed about the opening 320 in the sealing element 310 to serve as a detent feature matable with the dimple 280 disposed about the sound outlet 270 in the extending member 210. The sealing element 310 is preferably comprised of a compressible, closed-cell foam rubber and may be secured directly to the microphone 300 (FIG. 12) or to the main body 220.

When the extending member 210 is slid to the extended position as shown in FIG. 12, the sound outlet 270 aligns with the opening 320 in the sealing element 310 to form an acoustic path from the sound inlet 250 to the microphone 300. The dimple 280 disposed about the sound outlet 270 mates with the convex region 340 of the sealing element 310 to securely maintain the extending member 210 in the extended position. The sealing member 210 compresses to form a tight seal against the extending member 210, thereby preventing sound leakage between the two components.

When the extending member 210 is slid to the retracted position, sound may still be transmitted from the sound inlet 250 to the microphone 300. As shown in FIG. 13, the retracted position enables a portion of the sound inlet 250 to be in acoustic communication with the opening 320 in the sealing element 310. With this configuration, sound travels into the sound inlet 250, through the sealing element 310, and to a sound port 330 of the microphone 300. The acoustic duct 260 is essentially bypassed although some sound is expected to enter it. This embodiment allows the user to talk on the radiotelephone 200 with the extending member 210 in either retracted or extended positions.

In all embodiments, an off-hook mode of the radiotelephone could be activated by a hookswitch as the extending member is slid to the extended position. As the embodiment of FIGS. 10–13 suggests, to make or answer a call with the extending member 210 retracted, the user would have to press a button or otherwise activate the off-hook mode.

In accordance with the invention as described above, various modifications and alterations may be made by one skilled in the art without deviating from the scope of the invention as defined in the following claims.

We claim:

1. A radiotelephone comprising:

a main body containing a microphone;

a member having a distal end and a proximal end, said member being slidably connected to said main body and comprising an acoustic duct for carrying sound, said acoustic duct having at least one sound inlet at the distal end of said member and a sound outlet at the proximal end of said member, said member having an extended position wherein said member is slid away from said main body such that the sound inlet of said acoustic duct is exposed for sound collection and the sound outlet of said acoustic duct is positioned adjacent said microphone for sound transmission, said member having a retracted position wherein said member is slid toward said main body for storage, wherein the sound inlet of said acoustic duct is located adjacent said microphone for transmitting sound directly from the sound inlet of said acoustic duct to said microphone when said member is in the retracted position such that sound may be transmitted to said microphone when said member is in either of the retracted and extended positions; and a sealing element disposed adjacent said microphone, wherein, when said member is in the retracted position, said sealing element acoustically seals at least a portion of the sound inlet of said acoustic duct to said microphone.

2. The radiotelephone of claim 1 further comprising a sound port in said microphone for receiving sound.

3. The radiotelephone of claim 1 wherein said sealing element is a compressible grommet secured adjacent said microphone.

4. The radiotelephone of claim 2 further comprising a sealing element disposed adjacent the sound port of said microphone, said sealing element acoustically sealing the sound outlet of said acoustic duct to the sound port of said microphone when said member is in the extended position.

5. The radiotelephone of claim 4 wherein said sealing element is a compressible grommet secured adjacent the microphone, said grommet having an aperture aligning with the sound port of said microphone.

6. The radiotelephone of claim 1 wherein said member is exterior of said body in both retracted and extended positions.

7. The radiotelephone of claim 6 wherein said main body further comprises:

a top end and a bottom end opposite said top end; and a grooved track positioned along a direction from the top end to the bottom end of said main body;

wherein said member further comprises a projection slidably matable with said track for securing said member to said main body and for guiding said member between its retracted and extended positions.

8. The radiotelephone of claim 7 further comprising:

a first detent feature on said main body, and a second detent feature on said member, matable with the first detent feature and releasably locking said member to said main body when said member is slid to the extended position.

9. The radiotelephone of claim 8 wherein the first detent feature comprises a recessed area in the track of said main body, and the second detent feature comprises a protuberance on the projection of said member.

10. The radiotelephone of claim 4 wherein when said member is in the retracted position, said sealing element acoustically seals at least a portion of the sound inlet of said acoustic duct to said microphone.

11. The radiotelephone of claim 1 wherein said member is interior of said main body in the retracted position.

12. The radiotelephone of claim 11 further comprising a channel in said main body, said member being housed in said channel when said member is slid to the retracted position.

13. The radiotelephone of claim 11 wherein said member further comprises means for securing said member in the extended position.

14. The radiotelephone of claim 11 wherein said securing means comprises a dimple about the sound outlet of said acoustic duct and a bulge in said sealing element about the microphone sound port, the dimple mating with the bulge for securing said member in the extended position.

15. A radiotelephone, comprising:

a main body;

a microphone disposed within the main body and comprising a sound port;

a member having a distal end and a proximal end, said member being slidably connected to said main body and comprising an acoustic duct for carrying sound, said acoustic duct having at least one sound inlet at the distal end of said member and a sound outlet at the proximal end of said member, said member having an extended position wherein said member is slid away from said main body such that the sound inlet of said acoustic duct is exposed for sound collection and the sound outlet of said acoustic duct is positioned adjacent said microphone for sound transmission, said member having a retracted position wherein said member is slid toward said main body for storage, wherein the sound inlet of said acoustic duct is located adjacent said microphone for transmitting sound directly from the sound inlet of said acoustic duct to said microphone when said member is in the retracted position such that sound may be transmitted to said microphone when said member is in either of the retracted and extended positions; and a sealing element disposed adjacent said microphone;

wherein said sealing element acoustically seals said acoustic duct sound outlet to said microphone sound port when said member is in the extended position; and wherein said sealing element acoustically seals at least a portion of said acoustic duct sound inlet to said microphone sound port when said member is in the retracted position.

16. The radiotelephone of claim 15 wherein said sealing element is a compressible grommet secured adjacent said microphone.

17. The radiotelephone of claim 15 wherein said sealing element is a compressible grommet secured adjacent said microphone, said grommet having an aperture aligning with said microphone sound port.

18. The radiotelephone of claim 15 wherein said member is exterior of said main body in both retracted and extended positions.

19. The radiotelephone of claim 15 wherein said main body further comprises:

a top end and a bottom end opposite said top end; and a grooved track positioned along a direction from the top end to the bottom end of said main body;

wherein said member further comprises a projection slidably matable with said track for securing said member to said main body and for guiding said member between its retracted and extended positions.

20. The radiotelephone of claim 19 further comprising:

a first detent feature on said main body; and a second detent feature on said member, matable with the first detent feature and releasably locking said member to said main body when said member is slid to the extended position.

21. The radiotelephone of claim 20 wherein the first detent feature comprises a recessed area in the track of said main body, and the second detent feature comprises a protuberance on the projection of said member.

22. The radiotelephone of claim 21 wherein said member is interior of said main body in the retracted position.

23. The radiotelephone of claim 22 further comprising a channel in said main body, said member being housed in said channel when said member is slid to the retracted position.

24. The radiotelephone of claim 22 wherein said member further comprises means for securing said member in the extended position.

25. The radiotelephone of claim 22 wherein said securing means comprises a dimple about said acoustic duct sound outlet and a bulge in said sealing element about said microphone sound port, said dimple mating with said bulge for securing said member in the extended position.

* * * * *

UNITED STATES PATENT AND TRADEMARK OFFICE
CERTIFICATE OF CORRECTION

PATENT NO. : 6,101,402
DATED : August 8, 2000
INVENTOR(S) : Bartha et al.

It is certified that error appears in the above-identified patent and that said Letters Patent is hereby corrected as shown below:

Column 8,
Line 32, should read:

-- 22. The radiotelephone of claim 15 wherein said member --

Signed and Sealed this

Tenth Day of September, 2002

Attest:

Attesting Officer

JAMES E. ROGAN
Director of the United States Patent and Trademark Office